E. H. ASHCROFT.
Car-Track Clearer.
No. 10,715.  Patented Mar. 28, 1854.
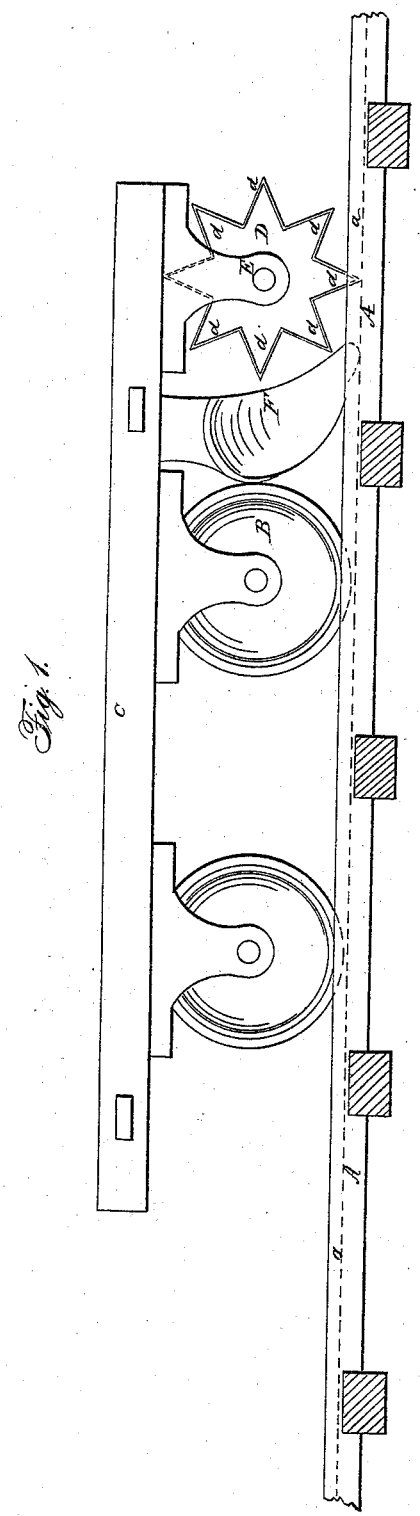
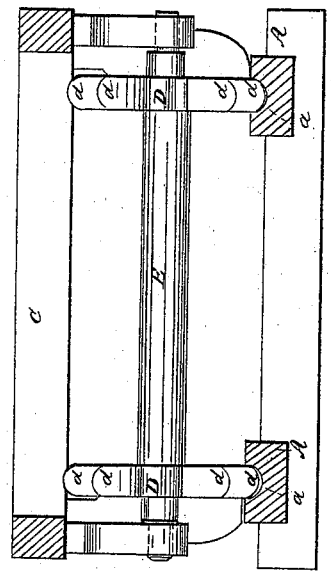
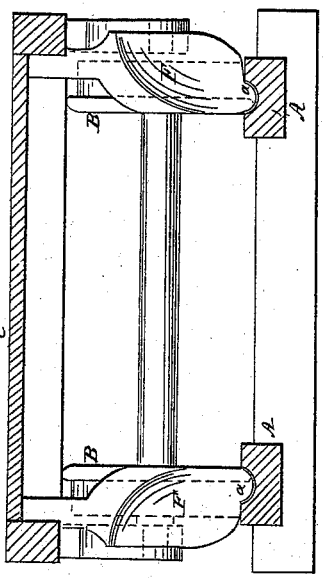

UNITED STATES PATENT OFFICE.

EDWARD H. ASHCROFT, OF BOSTON, MASSACHUSETTS.

IMPROVEMENT IN TRACK-CLEARERS FOR RAILROADS.

Specification forming part of Letters Patent No. 10,715, dated March 28, 1854.

*To all whom it may concern:*

Be it known that I, EDWARD H. ASHCROFT, of Boston, in the county of Suffolk and State of Massachusetts, have invented a new and useful Mechanism for Clearing Grooved Railroad-Tracks, of which the following is a full, clear, and exact description, reference being had to the accompanying drawings, which form part of this specification, and in which—

Figure 1 represents a longitudinal elevation of a railroad with grooved rails and a truck thereon with my improvement attached to it. Fig. 2 represents a transverse section of the rails and an elevation of the front end of the truck; and Fig. 3 represents a transverse section taken through the truck immediately in rear of the star-wheels, which form part of my improvement.

One great objection to groove-rails for railroads has been the liability of the groove to fill up with ice and snow, which becoming firmly packed within the groove, prevents or seriously interferes with the motion of the cars and greatly increases their tendency to run off the track; but in cities and other thoroughfares in which horses and vehicles are numerous the grooved rail, generally speaking, is the only practicable form which is admissible, because it is better preserved from injury and protrudes less above the regular level of the street, so that wheeled vehicles can cross the rails with less difficulty.

Various forms of scrapers and picks may be employed for clearing the grooves of these rails, but the kind I have represented and described is very well adapted to the purpose and is simple, and I deem a description of the modifications unnecessary.

In the drawings the grooves *a* in the rails A are represented as of semicircular form. The truck C, which may be an ordinary truck for the carriage of merchandise, may be the advance vehicle of a train, or it may be specially designed for clearing the track. It is provided in front with picker-wheels D, that run loosely on or with their axle E. These wheels are of star shape, being formed with any number of chisel-pointed spokes corresponding to the configuration of the transverse form of the groove *a* of the track into which they project, their points nearly touching the bottom. Immediately in the rear of these picker-wheels and in advance of the front running-wheels B of the truck are mold-boards or scrapers F, which are firmly secured to the side framing of the truck and project at their lower ends into the grooves, being of similar configuration at their lower extremities to the pickers *d* of the wheels D, while they are made of increased width above the grooves so as to project beyond the outer edge of the rails, and of such sweep or inclination backward and inward on their faces as to clear the upper surface of the rail of any snow or other obstacles that might lie thereon. It is obvious that as the truck *c* is moved forward the wheels D will be made to rotate by the contact of their spokes or picks with the snow, ice, earth, &c., in the grooves of the rails, the several pickers in succession entering, dividing, and breaking up the snow, ice, or earth into lengths corresponding with the distances between the pickers, and by the direction in which the pickers rotate the ice or snow thus separated by them will be prevented from being pushed forward by the mold-boards, which as they advance will raise the detached snow, ice, or earth from the grooves and throw it over the outside edges of the rails, as already specified. Thus instead of the mold-boards or scrapers having the resistance of a long firmly-embedded column of snow or ice in front to encounter they have simply to raise a short length or portion at a time and which has already been detached and broken by the revolving pickers.

It is obvious that both the picker and scraper may be constructed and operated in a great variety of modes to produce the same result, and that such an apparatus may be applied to a locomotive or to any or all the cars of a train or to single cars drawn by horses or otherwise, at the option of those who use them.

What I claim as my invention, and desire to secure by Letters Patent, is—

The method of clearing snow or ice or other like obstacles from grooved railroad-rails by means of a picker and mold-board or scraper, substantially as described.

In testimony whereof I have hereunto subscribed my name.

E. H. ASHCROFT.

Witnesses:
ISAAC STORY Jr.,
JOSIAH W. HUBBARD.